United States Patent Office 3,399,053
Patented Aug. 27, 1968

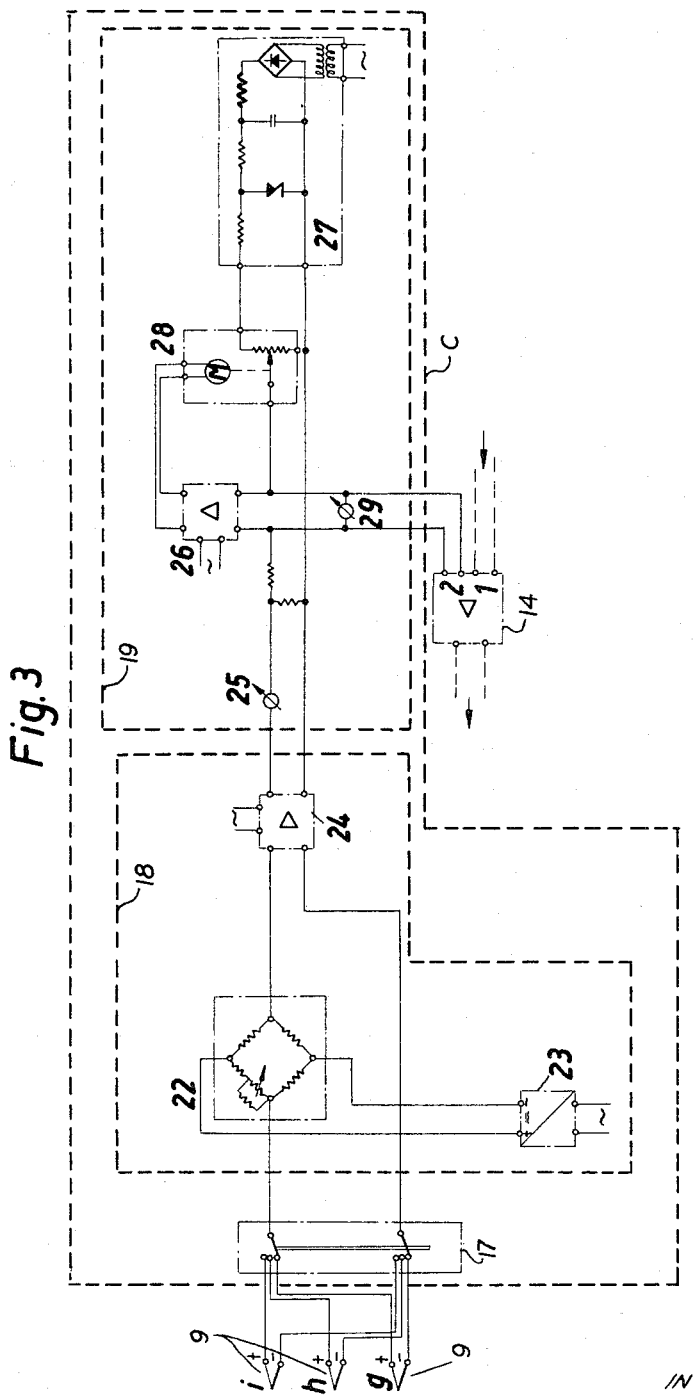

3,399,053
METHOD AND APPARATUS FOR CONTROLLING SINTERING PROCESSES IN CONVEYOR TYPE SINTERING MACHINES
Erich Schütz, Bischofsheim, and Walter Hastik, Frankfurt am Main, Germany, and Matthias Joseph Wilhelm Egbert Nievelstein, deceased, late of Frankfurt am Main, Germany, by Marta Maria Nievelstein and Ingrid Helmi Nievelstein, heirs, Frankfurt am Main, Germany, assignors to Metallgesellschaft Aktiengesellschaft, Frankfurt am Main, Germany
Filed Sept. 3, 1965, Ser. No. 492,350
Claims priority, application Germany, Sept. 5, 1964, M 62,349
6 Claims. (Cl. 75—5)

ABSTRACT OF THE DISCLOSURE

There is disclosed a method and apparatus for use in connection therewith for controlling the sintering of material moving along a predetermined conveyor path under the influence of forced draft combustion wherein the temperature of the waste gases resulting from the combustion is continuously sensed at a plurality of locations along the path of material and this data used for determining an approximate material temperature profile along either the entire length or a selected portion of the conveyor length between the charging and dumping stations. By continuously adjusting the speed of material movement in relation to the temperature profile determined by the waste gas temperature measurement, a selected material temperature profile and hence a maximum material temperature position with respect to the dumping station can be arrived at.

---

This invention relates in general to conveyor type equipment for sintering materials, and more particularly to a method and apparauts for controlling sintering processes performed by conveyor type sintering machines wherein material to be sintered is moved along a predetermined path for sintering under the influence of forced draft combustion.

Such machines are well known in the prior art, and are commonly used in the processing of ore, particularly iron ore, where it is desired to remove certain impurities by the action of high temperatures characteristic of sintering. In typical machine installations of this type, an endless train of grate cars or pallets are provided which carry the material to be sintered between a charging station and a discharge, or dumping station along a predetermined path. These grate car and pallet trains are usually arranged in the form of an endless belt conveyor which circulates in an approximately vertical plane to provide an upper course for conveying material deposited thereupon at the charging station through the sintering zone and to the dumping station, and a lower course for returning empty grate cars or pallets to the charging station for refilling. The upper course of the conveyor is passed under an igniting station or flame jet to ignite the material and thereby initiate the combustion associated with the sintering process.

A blower, flow connected to a plurality of suction boxes or ducts opening under the upper course of the conveyor grating is provided to suck air through the layer of ignited material carried upon the grating, thereby providing the forced draft required for sintering.

Since the capital investment of such sintering machines is relatively high, it is extremely desirable to utilize the available sintering area on the conveyor in such a manner as to obtain a maximum sintered material output per unit area.

Accordingly, to realize such a maximum efficiency, it is necessary that the conveyor be operated so that the sintering process is completed at a position as close as possible to the dumping station. In general, it can be stated that the sintering process is completed when the ignited zone of the material has penetrated from the top layer thereof down to a level closely above the grate. Since the conveyor continuously moves successive quantities of material toward the dumping station, the depth of ignition at a particular longitudinal station on the conveyor will increase with distance from the charging station until at a conveyor station which can be designated as the penetration point, the entire material layer is ignited down to the grate. If this penetration point, which corresponds substantially to the completion of sintering for the instantaneous quantity of material passing therethrough, lies on the sintering conveyor at any substantial distance before the dumping station, the length portion of the conveyor between the penetration point and dumping station will act as an unnecessary cooling station. Where there is no ignition penetration at any point on the conveyor between the charging and dumping stations, the material discharged will be incompletely sintered and consequently, an unsatisfactory product.

Even though successively distinct material layer portions will experience penetration sintering at some point before dumping, under normal operating conditions, it is convenient for analysis purposes to associate the penetration sintering point with the conveyor as a longitudinal station thereon, and to consider the material movement as relative to the penetration sintering station of the conveyor.

At the penetration sintering station, there is a maximum in the temperature of the waste gases sucked through the material layer, since the average temperature taken across the depth of the material layer is a maximum thereat. (Note.—Even for a constant absolute sintering temperature which may be equal to the average temperature at the penetration sintering station, at those conveyor stations where the material layer has not yet ignited completely through, the depth averaged temperature at such stations will be less than at the penetration sintering station.) Hence, the penetration sintering station can be readily identified for practical purposes by the temperature of waste gases passing through the material.

In sintering machines of the type contemplated by the invention, the sucking of air through the material is accomplished by means of a plurality of adjoining suction boxes opening under the conveyor grate. Thus, by sensing the temperature of the waste gas passing into each suction box, for a selected series group of suction boxes covering a portion of conveyor length including the station of maximum material temperature, the location of the penetration sintering point can be readily established with a suitable degree of precision by graphical techniques. For example, the station of maximum material temperature can be determined by fitting a smooth curve through the sensed waste gas temperature ordinate values on a graph wherein the abscissa corresponds to longitudinal stations on the conveyor.

In certain cases this can be done by sensing waste gas temperatures in the last three suction boxes before the dumping station, and by feeding the sensed temperature values to a conventional computer which provides an output signal corresponding to the position of maximum material temperature as approximated by the abscissa position of the apex of a recognition parabola fitted by such computer to the points corresponding to the individual sensed temperatures, with the ordinates of these points corresponding to temperature value, and their abscissa corresponding to the longitudinal stations of the suction boxes. The computer output signal which represents maximum material temperature, can be provided in various forms, such as for example, a variable resistance value, an electrical voltage, a shaft position, etc., as required for subsequent use.

The maximum material temperature position can be controllably shifted along the length of the conveyor, within limits, by adjusting the material movement speed of the conveyor. As can be appreciated by the artisan, for a given physical length conveyor, ignition and forced draft sintering conditions, by running the conveyor slowly, sintering will be completed at a shorter distance after charging and thus further behind the dumping station than where a conveyor is run faster.

Consequently, to maximize efficiency of operation, there is the problem of maintaining the material movement speed so as to realize as high a sintering production rate as permitted by the requirement for penetration sintering before dumping. This means that the material movement speed must be such that the maximum material temperature occurs just before dumping. If the material movement speed is increased too much in an attempt to obtain a higher yield, an incompletely sintered product will result. With too slow a material movement speed, a satisfactory sintered product will ordinarily result, but the yield will be less.

For practical reasons, it is undesirable to run the conveyor at a speed which results in attaining maximum material temperature exactly at the dumping station because intermittent variations in the sintering characteristics of the material could introduce incompletely sintered material into the product collected at the dumping station. Therefore, it is preferable to adjust the material movement speed so that maximum material temperature and thus, complete sintering occurs at a position corresponding to the next to the last suction box.

The invention provides a basic method for controlling the sintering of material moving along a predetermined conveyor path under the influence of forced draft combustion wherein the temperature of the waste gases resulting from such combustion is continuously sensed at a plurality of locations along the material movement path to determine an approximate material temperature profile along either the entire length thereof, or a selected portion of the conveyor length between the charging and dumping stations. By continuously adjusting the speed of material movement in relation to the temperature profile determined by waste gas temperature measurement, a selected material temperature profile and hence a maximum material temperature position with respect to the dumping station can be maintained. For this purpose, the apparatus according to the invention provides in combination with the conveyor means, a closed loop drive means responsive to the temperatures of waste gases resulting from sintering combustion at a plurality of longitudinal stations along the material movement path established by the conveyor means, said closed loop drive means being operatively connected to the conveyor drive means to effect material movement thereby at a speed which tends to maintain a selected maximum material temperature position in accordance with the instantaneous position of maximum material temperature and the rate of change thereof indicated by the waste gas temperatures.

The closed loop drive system can of course be implemented in a variety of forms to permit the use of various types of components. However, in accordance with the invention, the closed loop drive system is responsive to waste gas temperature not only to null the error between a selected reference position of maximum material temperature, but is also responsive to the rate of change thereof to permit a closer degree of sintering process control even under conditions where the sintering characteristics of succeeding material introduced onto the conveyor are changing.

The selected maximum material temperature position can be introduced into the signal flow path of the closed loop drive system by any conventional means, such as for example, by setting the resistance of a potentiometer at a value which corresponds to the selected position. A position error signal corresponding to the difference between the instantaneous and selected positions of maximum material temperature is generated by a signal comparator which receives a signal such as via the position selector means corresponding to the selected position, and a signal corresponding to the instantaneous position of maximum material temperature, such as can be derived from a computer connected to receive waste gas temperature sensor inputs.

As in conventional closed loop control systems wherein the error between the instantaneous value and the reference value of the variable sought to be controlled is used alone for effecting such control, there are definite limitations imposed upon the ultimate performance which can be achieved, particularly where such variable can experience rates of change which cannot be programmed into the system in advance.

To assure a sufficiently precise control of maximum material temperature position, which in the case of such sintering machines is preferably achieved via control of conveyor speed rather than through control of the ignition heating or forced draft air supply, the invention provides for predicting the rate of change of maximum material temperature position by waste gas temperature sensing ahead of the intended and normal range of maximum material temperature position. For example, if the position error signal from the comparator were applied alone to a conveyor speed controller, a relatively slow conveyor speed correction response would be realized, and consequently there would be comparatively long time delays in compensating for such variations in sintering characteristics as would tend to shift the maximum material temperature position, and hence less than optimum sintering efficiency would result.

This can be readily appreciated by the artisan, because when the composition of the material mixture to be sintered is changed, and such change also involves a change of the sintering time, the new location of the material temperature maximum, which is used as a conveyor speed control parameter, will not be recognized until the new mixture has passed over the suction boxes containing the waste gas temperature sensors that determine the position of maximum material temperature. Consequently, changes in the speed of the sintering conveyor by means of a controller responding solely to the change in position of maximum material temperature cannot become effective until the new mixture has moved from the charging station to a point near the dumping station where maximum material temperature normally occurs. In commonly used conveyor type sintering machines, this travel time is about 20 minutes, and thus a considerable lag is introduced into the conveyor speed control system.

Owing to this long lag period, it has been necessary to use a conveyor speed controller which effects only slight changes in material movement speed for a given maximum material temperature position error, i.e. the conveyor speed to position error gain factor must be low in order to avoid overshoots and undershoots in achieving the selected maximum material temperature position, such as might occur if a speed controller with a higher position error gain factor were used in an attempt to achieve a faster control response.

With a low gain conveyor speed controller, maximum material temperature position deviations from the selected position, i.e. errors, can be nulled out only after a relatively long time, and thus a sluggish response results.

The invention solves the problem of sluggish response by providing in addition to position error control, an additional compensating control of conveyor speed based upon the predicted, or impending rate of change in the maximum material temperature position. It has been found that a change in the position of maximum material temperature is accompanied by a corresponding change of the waste gas temperature in the suction boxes behind those wherein the temperature maximum ordinarily lies, i.e. in those suction boxes wherein the material temperature increases. According to the invention, this temperature is utilized in various circuits and control devices for controlling the speed of the centering conveyor. This means that an additional temperature measuring station is added to those already provided for measuring the temperatures near the dumping station of the sintering conveyor, with such additional temperature measuring stations being disposed at approximately the midpoint between the charging and dumping stations.

It has been found that the control of conveyor speed in dependence upon individual temperature values measured at points which are spaced along the conveyor is less critical than the change of such temperature values within a predetermined period of time. The invention proposes a method for the automatic control of the conveyor speed of a sintering conveyor, in which method the waste gas temperature is continually measured at a measuring station which is disposed approximately midway of the distance traveled by the sintering conveyor when the conveyor is moving at such a speed that the sintering process is completed exactly at the dumping station of the sintering conveyor, and any trend of this waste gas temperature to change is used to generate a control signal. According to the invention, such a trend or tendency to change, i.e. a time translated rate of change, can be communicated in the form of an electrical energy signal to a controller for directly controlling the conveyor speed. Also, it is within the scope of the invention to communicate impending changes in maximum material temperature position to a controller which receives from still another measuring station, such as for example a temperature measuring station located at the dumping station of the conveyor, an additional control signal which represents a deviation from a selected position value.

The changes in the location of the temperature maximum are indicated very soon by changes in the waste gas temperature at the suction box which is disposed at the lower portion of the ascending branch of the material temperature profile curve. Only the direction and rate of maximum material temperature position change are utilized for control purposes.

Another advantage of the control process according to the invention resides in that the trend of the maximum material temperature position to change rather than the temperature itself is utilized for control purposes, and the rate of action of this trend upon the controller can be freely adjusted by means of a differentiator network.

It is therefore an object of the invention to provide a method for controlling the sintering of materials moved along a predetermined conveyor path under the influence of forced draft sintering combustion.

Another object of the invention is to provide a method as aforesaid wherein the point on the conveyor at which the sintering process is completed can be maintained in a selected position approximate to the conveyor discharge station.

A further object of the invention is to provide a method as aforesaid wherein sintering process control can be achieved by conveyor speed control alone, without need for adjustment of the external ignition and forced draft conditions.

A further object of the invention is to provide a method as aforesaid wherein a close degree of sintering process control can be achieved.

A further object of the invention is to provide a method of sintering process control through conveyor speed control wherein automatic compensation is provided for changes in the sintering process rate.

Still another and further object of the invention is to provide an apparatus for performing the aforesaid method of sintering process control.

Other and further objects and advantages of the invention will become apparent from the following detailed description and accompanying drawings in which:

FIG. 3 is a schematic illustration of a preferred circuit which can be used in the apparatus of FIG. 1 for superposing material temperature trend information upon the conveyor speed control loop.

Figure 1:
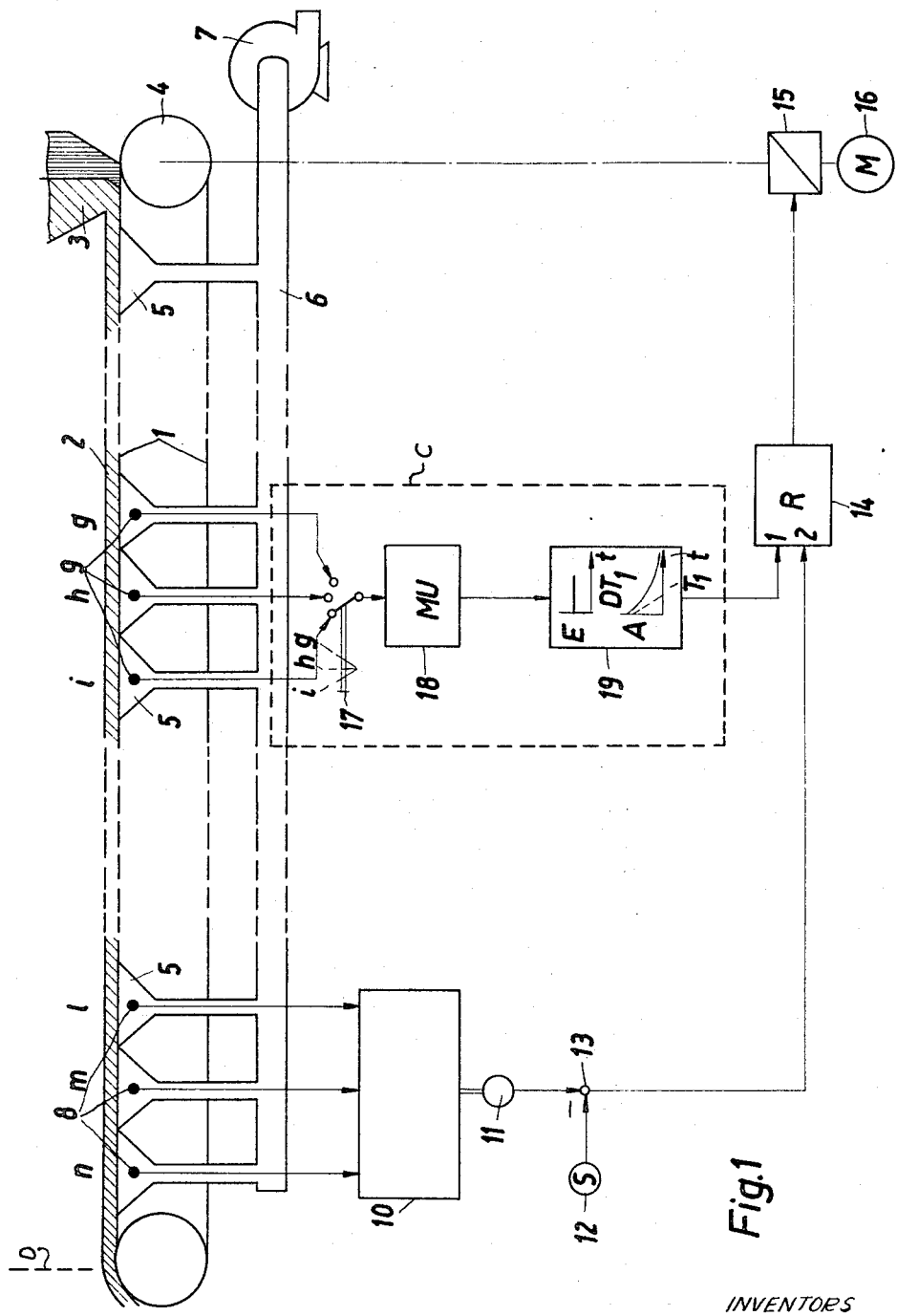
FIG. 1 is a schematic illustration of an apparatus for performing the sintering control method in accordance with a preferred embodiment of the invention.

Referring now to FIG. 1, an endless sintering conveyor 1 carries material 2 to be sintered, which has been charged by a hopper 3 located at the charging station of the conveyor 1. The material 2 is moved along a predetermined conveyor path by means of a drive unit 4 operatively connected to the conveyor 1.

A plurality of suction boxes 5 are disposed underneath the conveyor 1 which is of open, grate-like construction to permit air to flow through the material layer 2, such as ore carried thereby. The suction boxes 5 are open at one end adjacently underlying the conveyor 1 and are flow connected to a manifold suction duct 6 which in turn is flow connected to a suction blower 7.

When the blower 7 is operated, air is exhausted from the duct 6 and the suction boxes 5, thereby creating a forced draft for sintering the material 2. The material 2 can be ignited by any suitable conventional ignition means (not shown), such as for example a stove or flame jet arranged to ignite the material layer 2 at the upper portion thereof.

At the dumping end of the conveyor 1, the temperature of waste gases resulting from the sintering combustion is measured by a first group of three temperature sensors 8 disposed at three distinct stations $l$, $m$ and $n$ corresponding to the last three suction boxes 5 before the dumping station of the conveyor 1. An additional group of three temperature sensors 9 are disposed at each of the stations $g$, $h$ and $i$ corresponding to intermediate suction boxes 5 located approximately midway between the charging station under the hopper 3 and the discharge or dumping station D.

The waste gas temperature in the last three suction boxes 5 (stations $l$, $m$ and $n$) are measured by the sensors 8 which are operatively connected to a computer 10. The computer 10 is used to ascertain the location of the apex of the parabola which approximates the three temperature measuring points $l$, $m$ and $n$ (see FIG. 2). The output element of the computer 10 is preferably in the form of a variable resistor 11, such as a potentiometer, the resistance of which depends on the location of the temperature maximum. The desired location of the maximum material temperature is set by means of a selector 12. In a comparator circuit 13, the temperature maximum location which has been selected by the selector 12 is compared with the actual instantaneous value which is represented by the output of the computer 10. Any deviation or error between the instantaneous actual value of maximum material temperature and the selected value is fed to a controller 14, which adjusts in a suitable manner a speed control device 15 responsive thereto for controlling the material movement speed of the sintering conveyor 1.

The controller 15 regulates the speed of material motion effected by a motor 16 which is operatively connected to the conveyor drive unit 4. Alternatively, the controller 14 can be operatively connected to a variable speed motor 16 for direct control of the material movement speed without the controller 15.

A signal conditioner C is operatively connected to receive inputs from each of the temperature sensors 9 located at $g$, $h$ and $i$ and to generate a signal corresponding to the rate of change of maximum material temperature as predicted by said signal conditioner C on the basis of waste gas temperatures sensed by the sensors 9.

Figure 2:
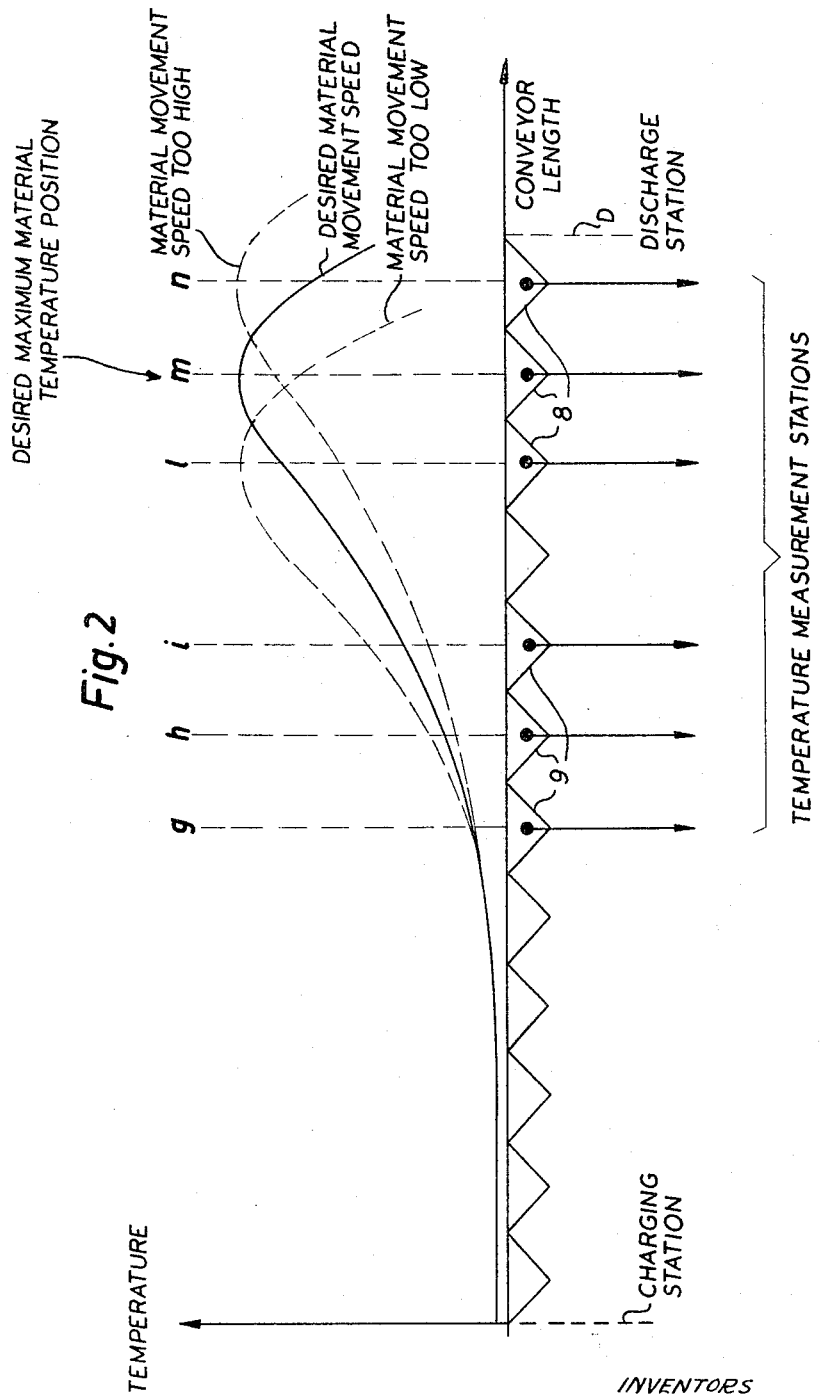
FIG. 2 is a graph which a typical range of material temperature profiles resulting from the operation of the sintering control apparatus of FIG. 1.

Such rate of change prediction can be accomplished in numerous ways by various types of signal conditioning devices C, but according to the invention, a signal comparator type selector switch 17 selects the particular sensor 9, as for example the sensor 9 located at *i*, which lies at the lower portion of the ascending branch of the temperature profile curve as shown in FIG. 2, and feeds the signal from the sensor 9 to a transducer 18 for conversion into a preferred type of signal, such as for example a train of pulses, a D-C level or an A-C signal, with such amplification as required for further processing.

The output signal of the transducer 18 is fed to a differentiator 19 for conversion thereby into a signal representing the rate of change of the maximum material temperature position as predicted on the rate of temperature sensed by the sensor 9.

A preferred circuit arrangement for the signal conditioner C is shown in greater detail in FIG. 3. The sensors 9 are thermocouples disposed for waste gas temperature measurement at *g*, *h*, and *i* in the suction boxes 5. The selector switch 17 enables a selection of that one of the three sensors 9 which is disposed at the lower portion of the ascending branch of the waste gas temperature curve which corresponds directly to the material temperature profile. A compensating network 22 is fed by a source of constant voltage 23 and serves for balancing out small temperature variations at the measuring station. A measuring amplifier 24 transforms the smooth temperature analog voltage derived from the compensating network 22 into a modulated current. This current is fed through an indicator 25 to the first input of a control amplifier 26. A source of constant voltage 27 feeds a motor driven potentiometer 28, the output of which is applied to a second input of the control amplifier 26.

When there is a voltage difference between the two inputs of the amplifier 26, the latter controls the motor adjustable potentiometer 28 to adjust the latter until the inputs of the amplifier 26 are balanced to zero difference. The course of this balancing operation, which takes place in response to a temperature change depends on the setting of the control amplifier 26 and the speed at which potentiometer 28 is being adjusted. The voltage difference between the two inputs of the amplifier 26 is indicated by an indicator 29 as a deviation and is applied as an auxiliary variable to a second input of the controller 14. A signal is fed to this second input only in case of a temperature change and is completely eliminated by the immediately initiated balancing operation in a time which depends upon the setting of the balancing circuit.

The amplifiers 24 and 26 can be commercially available amplifiers, such as transductors. Without a change in basic functional operation, any other amplifier such as a vacuum tube amplifier or a transistor amplifier, etc. may be substituted.

As will be apaprent to the artisan from the foregoing description, the method of the instant invention can be simply expressed in terms of the concurrent steps of continuously sensing the temperatures of waste gases resulting from sintering combustion at a first plurality of locations *l*, *m*, *n*, along the material movement path adjacent to the material discharge position D thereon to determine via the computer 10, the approximate position of the maximum temperature in the material 2, continuously sensing the temperature of such waste gases at a second plurality of locations *g*, *h* and *i* along said path disposed approximately midway between the material charging, or entrance and discharge positions thereon to establish a predicted rate of change in said maximum temperature position via the transducer 18 and differentiator 19, and continuously adjusting the speed of material movement in relation to the maximum temperature position and predicted rate of change thereof established by waste gas temperatures sensed at the first and second pluralities of locations of the sensors 8 and 9 respectively to maintain the maximum material temperature position in a predetermined relation to the material discharge position D of the conveyor path.

Without regard for the particular apparatus used, this method of the invention can be further described as being one wherein signals corresponding to the actual instantaneous maximum material temperature position and a selected position thereof are continuously generated and compared to produce a position error signal corresponding to their difference, and wherein a signal corresponding to the predicted rate of change of maximum material temperature position is generated and combined with the position error signal to produce a conveyor speed control signal which is compensated for rate of change of maximum temperature position. This conveyor speed control signal is applied to a conveyor drive means, such as for example, the combination represented by the controller 15, motor 16 and drive unit 4, to effect material movement at a speed along the conveyor 1 path which tends to null the error between the instantaneous and the selected maximum temperature positions with compensation for impending changes, i.e. rate of change, in maximum temperature position.

While as in other control systems, the signals used for effecting the intended control functions can be mechanical, hydraulic, etc., in the method and apparatus of the instant invention such signals are preferably electrical signals.

Essentially the apparatus for performing the method of sintering control according to the invention is a combination of a conveyor 1 and a closed loop controlled drive system operatively connected to the conveyor 1 for effecting material movement thereby along a predetermined path at a speed which tends to maintain a selected maximum material temperature thereon in accordance with the instantaneous position of maximum material temperature and predicted rate of change thereof indicated by the temperatures of waste gases sensed at two separately located portions on the path of material movement.

The temperature sensors 8 together with the computer 10 and output potentiometer 11 serve to generate a signal corresponding to the actual instantaneous position of maximum material temperature.

A signal corresponding to a selected reference position of maximum material temperature is provided by the selector 12, and this reference signal is compared with the actual instantaneous position signal by the comparator 13 which produces a position error signal corresponding to their difference. This position error signal is one of two signals which are combined and applied in a controller 14 to produce a composite control signal which is applied to a second controller 15 for effecting required changes in the material movement speed of the conveyor 1.

The other signal applied to the controller 14 represents the predicted rate of change in maximum material temperature position and is derived from the temperature sensors 9 located at the midpoint of the conveyor 1. This predicted rate of change signal is derived from the temperature sensors 9 via the transducer 18 and differentiator 19 of the signal conditioner C.

The controller 14 actually functions as a signal summing device since its output signal is a composite control signal based upon the combined effect of position error and predicted rate of change thereof.

For example, where the predicted rate of change is zero, the position error alone will control the response of the conveyor 1 drive. Likewise, where the position error is zero, the predicted rate of change signal will control the adjustment of conveyor 1 speed. Thus, the invention affords an automatic control of conveyor speed on the basis of both the instantaneous position of maximum material temperature and predicted rate of change thereof derived in advance with respect to time of occurrence at the conveyor station of interest.

Because of the potential variety of materials which can be controllably sintered in accordance with the method of the invention, no attempt is made to specify the transfer function characteristics and gain factors of the various elements of the closed loop control system used in the apparatus of the invention. Such detail characteristics can be readily established by applying conventional servo mechanism engineering techniques to the arrangement of components available for constructing the apparatus.

In general, it can be specified that a material speed control system which is overdamped is preferable to one which is underdamped, in the event that a critically damped response cannot be achieved with the components available. The reason for this is because an overdamped system will be free from such overshoots which could result in contaminating the collected sintered product with incompletely sintered material. However, a limited degree of underdamping which does not result in incomplete sintering could be tolerated.

Furthermore, it should be noted that with appropriate calibration of the discharge station D sintered product characteristics versus the temperature of waste gases sensed at $g$, $h$ and $i$, it is possible to eliminate that portion of the apparatus, i.e. the sensors 8, computer 10, which serve for the generation of the position error signal, and thus to operate the conveyor 1 on the basis of temperature information sensed at $g$, $h$, and $i$ alone.

The material temperature profile curves of FIG. 2 illustrate the effect of variations in the conveyor 1 material movement speed insofar as they effect the position of maximum material temperature. As indicated therein, when the conveyor material movement speed is too high the temperature profile curve is shifted so that its maximum tends to move closer to the discharge station, and in the extreme case, there will be no maximum material temperature corresponding to complete sintering at any portion along the conveyor. On the other hand, where the conveyor material movement speed is too low, the position of maximum material temperature tends to move toward the charging station and hence away from the discharge station. For practical purposes, the conveyor is operated at a material movement speed which causes the maximum material temperature to be located at a position overlying the next to the last suction box 5.

What is claimed is:

1. A method for controlling the sintering of material moving along a predetermined conveyor path under the influence of forced draft sintering combustion, which comprises continuously sensing the temperatures of waste gases resulting from such sintering combustion at a first plurality of locations along said material movement path disposed in proximity to the material discharge position thereon to establish approximately the instantaneous position of maximum temperature in said material, continuously sensing the temperatures of such waste gases at a second plurality of locations along said path disposed in proximity to the midpoint between the material entrance and discharge positions thereon to establish a predicted rate of change of said maximum temperature position, continuously generating a signal corresponding to said instantaneous maximum temperature, continuously generating a signal corresponding to a selected maximum temperature position, continuously comparing said instantaneous and selected maximum temperature positions and generating a position error signal corresponding to their difference, continuously generating a signal corresponding to said predicted rate of change of said maximum temperature position, combining said position error and predicted rate of change signals to generate a conveyor speed control signal compensated for rate of change maximum temperature position, and applying said conveyor speed control signal to a conveyor drive means to effect material movement at a speed along said conveyor path which tends to null the error between the instantaneous and the selected maximum temperature positions with compensation for rate of change in maximum temperature position.

2. The method according to claim 1 wherein the generated signals corresponding to instantaneous maximum temperature position, selected maximum temperature position, position error, predicted rate of change of maximum temperature position, and the conveyor speed control signal are electrical signals.

3. The method according to claim 1 wherein the instantaneous position of maximum material temperature is established on the basis of waste gas temperatures sensed at three separate locations disposed in proximity to the material discharge position.

4. The method according to claim 1 wherein the predicted rate of change in the position of maximum material temperature is established on the basis of waste gas temperatures sensed at three separate locations disposed in proximity to the midpoint between the material entrance and discharge positions.

5. The method according to claim 1 wherein the instantaneous position of maximum material temperature is established on the basis of waste gas temperatures sensed at three separate locations disposed in proximity to the material discharge position, and wherein the predicted rate of change in the position of maximum material temperature is established on the basis of waste gas temperatures sensed at three separate locations disposed in proximity to the midpoint between the material entrance and discharge positions.

6. An apparatus for controlling the sintering of material which comprises a conveyor means disposed for moving material along a predetermined path for sintering under the influence of forced draft combustion and a closed loop controlled drive means including a first plurality of sensors disposed for sensing waste gas temperatures along a first portion of said material movement path, a computer means operatively connected to said first plurality of sensors and responsive thereto to generate a control signal corresponding to the instantaneous position of maximum material temperature as indicated by waste gas temperature sensed along said first path portion, an error detecting means operatively connected to said computer means for generating a position error signal in response to the difference between a selected reference position of maximum material temperature and the instantaneous position thereof represented by the control signal generated by said computer means, at least one sensor disposed for sensing waste gas temperature at a second portion on said material movement path behind the first portion thereof to generate a signal corresponding to the material temperature at said second path portion, a signal conditioning means operatively connected to said second path portion temperature sensor and responsive to the signal generated thereby to generate a control signal corresponding to the rate of change of said instantaneous position of maximum material temperature as predicted on the basis of waste gas temperature sensed at the second path portion, and signal combining means operatively connected to said signal conditioning means and said error detecting means for generating a conveyor control signal in response to the predicted rate of change and position error signals therefrom to establish a material movement speed which tends to null the difference between the instantaneous and the selected positions of maximum material temperature.

References Cited

UNITED STATES PATENTS

| 2,878,003 | 3/1959 | Dykeman et al. | 75—5 |
| 3,149,192 | 9/1964 | Schuerger et al. | 75—5 |
| 3,211,441 | 10/1965 | Miyakawa et al. | 75—5 |
| 3,275,431 | 9/1966 | Sawada | 75—5 |

BENJAMIN HENKIN, *Primary Examiner.*